UNITED STATES PATENT OFFICE.

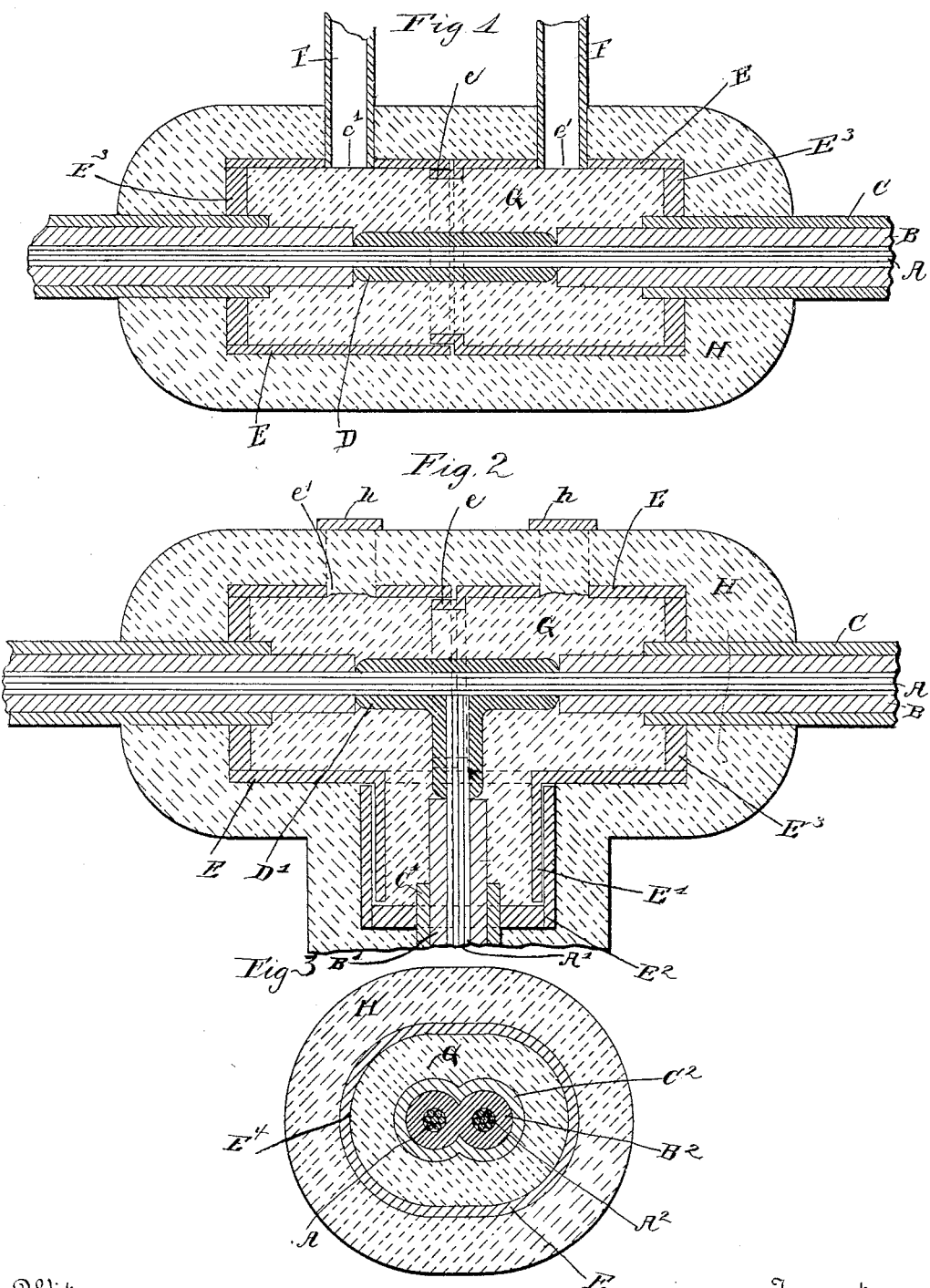

FREDERICK M. BENNETT, OF NEW YORK, N. Y., ASSIGNOR TO JOSEPH W. MARSH, OF PITTSBURG, PENNSYLVANIA.

CAST JOINT FOR ARMORED CONDUCTORS.

SPECIFICATION forming part of Letters Patent No. 479,386, dated July 19, 1892.

Application filed March 28, 1890. Serial No. 345,693. (No model.)

*To all whom it may concern:*

Be it known that I, FREDERICK M. BENNETT, a citizen of the United States, and a resident of New York, county and State of New York, have invented a certain new and useful Improvement in Hollow Cast Joints for Metal-Armored Conductors, of which the following is a specification.

My invention relates to hollow cast joints for electric wires provided with a metal armor, and has for its object the provision of a device simple in construction, cheap in manufacture, and efficient in practical use.

To attain the desired end my invention consists in the construction and arrangement of parts hereinafter described and claimed.

In the drawings which form a part of this specification, Figure 1 represents a longitudinal vertical section of my appliance; and Fig. 2 a longitudinal section, and Fig. 3 a transverse section, of other articles constructed according to my invention.

Like letters of reference wherever they occur indicate corresponding parts in all the figures.

Referring again to the drawings, A represents an electric conductor, B the insulating-wrapping of the same, and C the metal coating or armor with which it is provided.

In cases where it is desired to apply my hollow cast joint to cables about to be connected the bare ends of the conductors A are placed end to end within a sleeve D, the insulating-wrapping B and armor C having been stripped from the ends of the conductors for a short distance, as is clearly shown in the drawings.

In order to provide means for forming my hollow cast joint, I use a cylindrical box E, constructed in two or more sections out of papier-maché or other suitable material, the ends $E^3$ of which are provided with openings of such diameter as to snugly fit upon the armor C of the conductor. After the sections of the box E have been placed on the respective ends of the cables to be connected the two parts of the box E are brought together and engaged with each other, one part being preferably provided with a shoulder e. The box E is constructed of such length that the ends $E^3$ of the same, which may be integral or made of leather or other material, will rest upon the metal armor C of the conductor, a hollow core thus being secured.

Into the apertures e' formed in the box E are screwed pipes F, after which the whole may be placed within a mold of suitable size and construction, and a solid mass of metal, as lead H, is cast around the joint, completely surrounding and inclosing the hollow core formed by the box E and uniting with the metal armor on each side of the joint. The apertures e' serve both as a means of escape for the heated air and gas in casting, thereby preventing any flowing of the lead, and also to provide channels by which the interior hollow chamber within the box E may be filled with any suitable liquid or plastic insulating material G, that will afterward harden, as melted paraffine, asphaltum, &c., thus covering the bare conductors A and sleeve D and serving, together with the insulating-wrapping B, to thoroughly insulate the same.

The cylindrical channels made by the pipes F, which are now removed, may either be filled with insulating material, and a cap, as h, Fig. 2, soldered over the tops of the same, or melted lead may, if preferred, be poured into them.

In the instance under consideration the conductors to be joined have been placed end to end; but when a connection is desired to be made between two cables, one at an angle to the other, as in Fig. 2, the box E may be provided with a drum E', one-half of the vertical cylindrical drum-shell being attached to one part of the box E and the other to the opposite one, and after the parts are joined together, the armor and insulating-wrapping having been removed from the conductors C C', as shown, and the two ends of the cable C and the end of the conductor C' being incased in a T-coupling, and the whole soldered together, a cap $E^2$, provided with depending sides, is placed over the drum E', thus securing the parts of my box or hollow core together, after which the lead H may be cast around the same by the use of a suitable mold in a manner similar to that before described. A perfectly-tight hollow cast joint is thus formed, which may afterward be filled with the insulating material G, as and in the manner hereinbefore described.

For use with duplex cables my hollow sectional box E may be provided with integral ends or washers $E^4$, Fig. 3, the inner contours of which are adapted to snugly hug the metal armor $C^2$, and the outer periphery of which fits tightly into or forms a part of the cylindrical shell of my box $E^2$, and for other forms of conductors the size and contour of my box E and ends therefor may be modified so as to conform to the requirements of its use in any particular case.

As it is evident that many slight changes in the construction and relative arrangement of parts might be resorted to without departing from the spirit and scope of my invention, I would have it understood that I do not restrict myself to the particular construction and arrangement of parts shown and described, but that I reserve the right to make such changes.

I am aware of Patent No. 464,475 to H. W. Fisher, dated December 1, 1891, and I make no claim to any of the features of invention shown, described, and claimed therein.

What I claim as new, and desire to secure by Letters Patent, is—

1. As a means for making joints for electric cables, a hollow box-body having separable ends, the ends having openings, the inner contours of which are adapted to snugly hug the periphery of the cables to be joined, while the outer periphery of the ends fits tightly into the cylindrical body of the box, substantially as described.

2. As a means for making joints for electrical cables, a hollow cylindrical box-body having ends fitting the contour of the cables and having a drum at one side of the cylinder and an end piece fitting the contour of the cables and adapted to be applied to the drum, substantially as described.

3. As a means for uniting cables at an angle to each other, a cylindrical box having a drum provided with end pieces fitting the coupling of the cables and a joint for the reception of the exposed ends of the conductors of the cables, substantially as described.

4. As a means for making a T-shaped joint for electrical cables, the combination, with the exposed ends of the conductors of the adjacent cables, of a T-shaped coupling-piece, to which the ends are connected, and a cylindrical box having a drum, the box being provided with heads, through which the adjacent ends of the cables pass, substantially as described.

5. The combination, with two or more metal armored conductors, of a hollow cast-metal joint and of a hollow core, both provided with perforations and stopping devices.

In testimony of the foregoing specification I do hereby sign the same, in the city, county, and State of New York, this 10th day of March, A. D. 1890.

FREDERICK M. BENNETT.

Witnesses:
WILLIAM H. RODIER,
JOSEPH ARTHUR BLACKMAN.